Oct. 27, 1936.    M. F. PETERS    2,058,619
IGNITION CABLE
Filed May 22, 1934
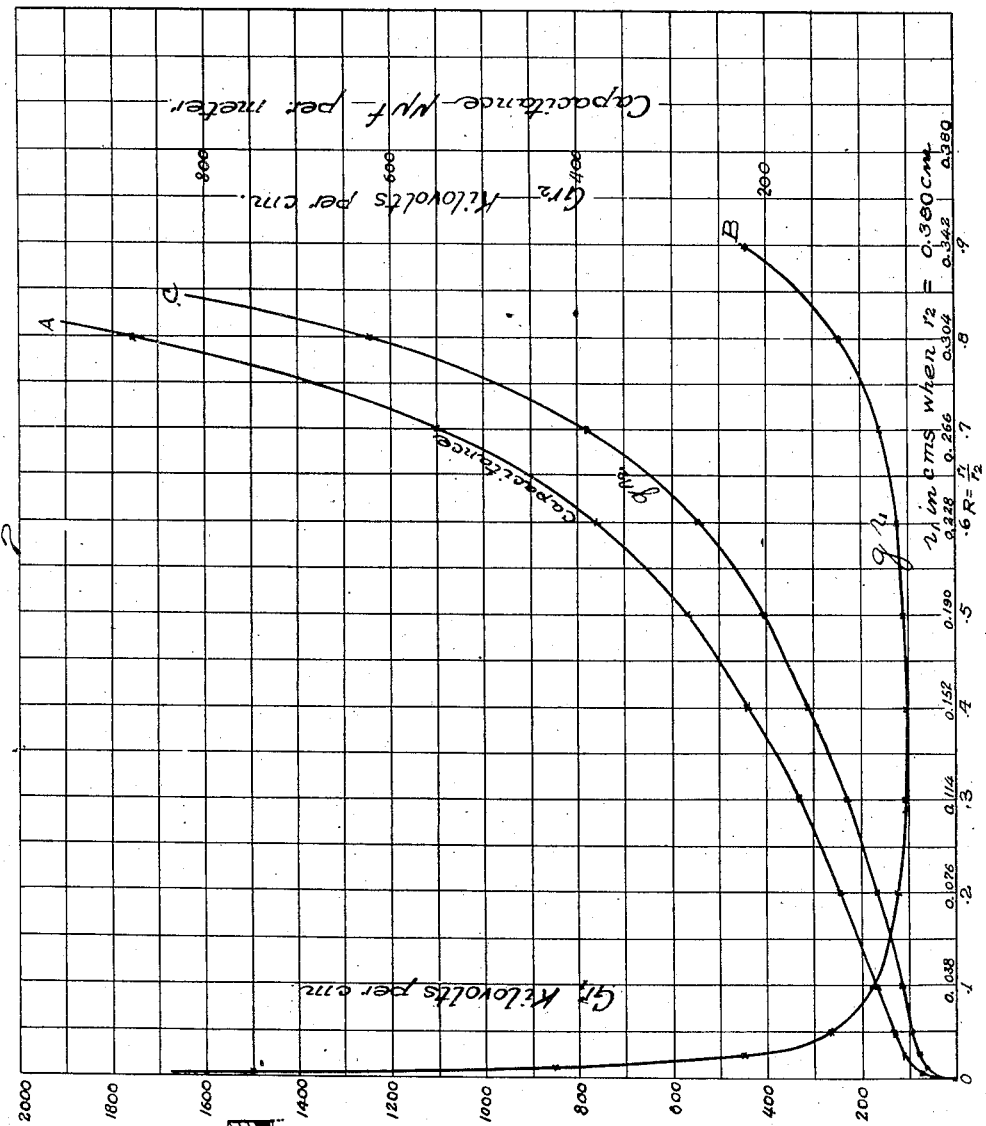
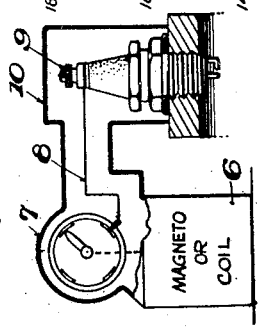
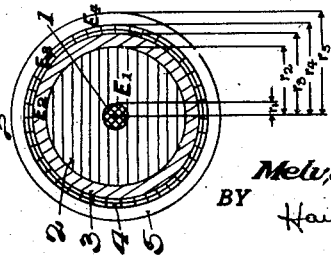
INVENTOR
Melville F. Peters
BY Harold Todd
ATTORNEY

UNITED STATES PATENT OFFICE 2,058,619

IGNITION CABLE

Melville F. Peters, Riverdale, Md., assignor to
Sidney F. Mashbir, Washington, D. C.

Application May 22, 1934, Serial No. 726,895

16 Claims. (Cl. 123—148)

(Granted under the act of March 3, 1883, as
amended April 30, 1928; 370 O. G. 757)

The present invention relates to cables and, more particularly, to cables which are particularly designed as conductors of electricity.

It is an object of this invention to provide a cable which is particularly intended for use as a conductor of electricity and which is so designed that the capacitance per unit length thereof, when an electric current is passed therethrough, is a minimum, or is in the range of the minimum value of capacitance which is permissible without subjecting the insulating material of the cable to excessive electrical stresses or reducing the mechanical strength of the cable below a permissible value. It is further proposed, by the invention, to provide a cable particularly for use as a conductor of electricity which, in addition to its characteristic of low capacitance, as outlined hereinbefore, will also have high values of resistance and inductance per unit length. In this connection, it is a principal object of the invention to provide a cable for use in the ignition system of an internal combustion engine which will have a lower capacitance and higher resistance per unit of length than cables heretofore employed to connect the spark plugs and source of energy of an ignition system.

In carrying my invention into effect, I provide, as is usual in the design and construction of conductors of electricity, a conductor and insulating and, if desired, shielding means surrounding the conductor. In order to secure minimum capacitance of the cable, or a capacitance which is in the range of the minimum permissible value thereof, in accordance with the considerations hereinbefore outlined, I reduce the diameter of the conductor element of the cable, with respect to the known and fixed outside diameter of the cable, to as small a value as is consistent with a safe value of electrical gradient in the insulator adjacent to the conductor and with sufficient mechanical strength of the conductor and cable. In order to permit reduction of the conductor diameter, and consequent achievement of reduction of capacitance, to a value which is far below any possible reduction of the diameter of a copper conductor, which reduction would be severely limited by considerations of mechanical strength, I propose to form the conductor portion of the cable from a material having considerably greater mechanical strength than copper, such for example as steel, stainless steel or phosphor bronze. By the use of these materials, greater permissible reductions in the diameter of the conductor may be achieved, with consequent increased advantages in the resulting decrease in capacitance per unit length of the cable.

Further, by reason of the use of the materials set forth hereinbefore for the construction of the conductor portion of the cable, I achieve increased resistance per unit length of the cable above the resistance per unit length of a cable having a copper conductor. With respect to the application of my invention to ignition systems of internal combustion engines, I have found that from the standpoint of decreased radio interference and efficient operation of the ignition system, a high resistance of the secondary leads is desirable. Consequently, the use of the materials specified, or similar materials, for the construction of the conductor element of an ignition cable permits not only the achievement of greater reduction in capacitance, as set forth hereinbefore, but causes further improved operation of an ignition system in which the cable may be used, by reason of the increased resistance of the conductor.

While the invention is applicable generally to the construction of cables designed as conductors of electricity, a particular application thereof lies in the use of the cable, designed according to the invention, as a connection between the spark plug, or other ignition means, and the source of electric energy in ignition systems for internal combustion engines. In connection with this practical application of my invention, I have found that the use, in an ignition system of an internal combustion engine, of an ignition cable formed according to the present invention provides certain advantages and new results not provided by ignition cables designed in the manner heretofore known to the art, nor known or realized by those skilled in the art and the provision of an ignition cable which provides these advantages and new results is one of the principal objects of the invention. Among these advantages and new results which it is the object of the invention to provide may be mentioned the requirement of less energy to bring the secondary side of the ignition system up to the breakdown voltage of the spark gap, the reduction of interference with radio reception, the decrease in the amplitude and number of the oscillations which normally follow the discharge of the spark plug. Further, due to the low capacitance of the ignition cable formed according to the present invention, the engine will idle at lower speeds when a magneto is used and the spark plug will fire with lower battery voltage when a spark coil is used, and in both cases the spark plug will fire with a greater opening with the same energy from the source of electric current.

My invention is particularly described in the following specification and certain features and matters explanatory of the invention are illustrated in the annexed drawing. It is to be specifically understood, however, that the invention is not limited in any way by the specification and drawing, or otherwise than by the appended claims.

Referring to the drawing:

Fig. 1 is a cross-sectional view of a cable which may be constructed according to the present invention;

Fig. 2 is a graphic analysis of certain features of the invention, and

Fig. 3 is a schematic view of parts of an ignition system.

It is well-known that the ignition system of an internal combustion engine interferes considerably with reception by radio receiving sets carried by vehicles which are driven by such internal combustion engines. This effect is due to the fact that the component parts of the ignition system, such as the magneto, leads and spark plugs, act as condensers and the capacity effect so produced causes electrical conditions to be set up which react adversely on the signal reception of any nearby radio receiving set.

In order to prevent or decrease the interference with radio reception caused by ignition systems, as described hereinbefore, it has become the common practice to shield the various parts of the ignition system in various manners, as by incasing the ignition leads and spark plugs in shields of metal, or other materials. When such shielding harness is employed it has been found that the capacitance to ground of the shielded ignition system is increased, thereby requiring a greater amount of energy to be supplied by the spark generator to produce the required breakdown voltage at the spark plugs. While the use of shielding increases greatly the capacitance to ground of the ignition system, thereby rendering the present invention particularly valuable in connection with shielded systems, the invention is also useful with unshielded systems. In ignition systems employing no shielding whatsoever, the problems and effects caused by capacitance are almost as marked as those in shielded systems. In the shielded systems the shielding harness provides the ground, while in unshielded systems the engine or other metallic part is the ground. The present invention is therefore fully applicable to both shielded and unshielded systems and when the capacitance of the ignition system is referred to hereinafter, it is to be understood as referring to the capacitance to ground of either a shielded or unshielded ignition system.

In this connection it has been found that the energy required to bring the secondary side of an ignition system up to the breakdown voltage of the spark-gap may be expressed by the equation $$H = \tfrac{1}{2} C E^2$$

where H is the energy required, expressed in joules, C is the capacitance of the secondary side, expressed in farads, and E is the breakdown voltage of the gap, expressed in volts.

It will be apparent from this equation that the energy required to bring the secondary side of the ignition system up to the breakdown voltage of the spark-gap varies directly as the capacitance of such secondary side.

It has further been found that in an unshielded ignition system employing known types of ignition cable, the capacitance of each of the secondary leads is of the order of $40 \times 10^{-12}$ to $110 \times 10^{-12}$ farads. When this same cable is placed in a shielding harness the capacitance of the longest lead may be increased to $250 \times 10^{-12}$ to $350 \times 10^{-12}$ farads. It will be apparent, therefore, that the increased capacitance due to shielding causes a very appreciable increase in the amount of energy required from the spark generator to bring the secondary side of the ignition system up to the breakdown voltage of the spark-gap. This effect is so pronounced that it has long been observed that magneto and spark coil operation in shielded systems is not as satisfactory as in unshielded harnesses.

In studying this problem, I have found that the capacitance of a shielded or unshielded ignition system may be reduced by employing an ignition cable which will have such characteristics that a maximum decrease in the capacitance of the secondary side of the ignition system is obtained because of the use of such cable. Such an ignition cable, in order to obtain the optimum results, should have as low a capacitance per unit length as is consistent with a good value of electrical gradient in the insulation of such cable. In other words, the ignition cable should be so designed as to have the smallest possible capacitance without subjecting the dielectric to excessive electrical stresses.

Referring to Fig. 1 of the drawing it will be seen that the cross-section of an ignition cable is disclosed, the same comprising the wire conductor 1, the rubber insulation 2, the braid 3, the lacquer 4, and the shielding 5, all of such elements being disposed about the wire conductor in abutting concentric cylinders. It will also be observed that the elements noted have, respectively, the radii $r_1$, $r_2$, $r_3$, $r_4$ and $r_5$. This specific cable construction is shown for purpose of illustration only, as it will be apparent that a greater or less number of dielectric and shielding materials may be employed without, in any way, departing from the scope of the invention. In a cable having $n$ layers of insulation, the outside radius of the cable will be represented by the term $r_{n+1}$. A schematic view of a shielded ignition system is disclosed in Fig. 3, in which is disclosed the magneto 6, distributor 7, cable 8, spark plug 9, and shielding 10.

In developing the construction of an ignition cable having the best practical characteristics as outlined above, I have considered the component members of the cable as a plurality of concentric cylinders. When an electric current is passed through the cable, the lines of force of the field set up by such current are radial, and the number of lines of force touching the surface of the inner cylinder, or conductor, must equal the number touching the outer cylinder. Since the flux density is equal to the total flux divided by the area, it is obvious that the flux density, and therefore the gradient, is generally greatest at the surface of the inner cylinder.

In case a homogeneous dielectric is used and the outer cylinder grounded, the capacitance per unit length may be found as follows:

If the inner cylinder is given a charge $\psi$ per unit length, the electric intensity, or gradient, $gx$, at a distance $x$ from the axis is given by textbooks as $$gx = \frac{dV}{dx} = \frac{-2\psi}{\epsilon_a}$$

where V is the difference of potential between the wire and the point $x$ and, since $\psi = CE$ $$g = \frac{-2ce}{\epsilon_x} \quad (1)$$

in which C is the capacitance, E is the potential difference between the conductor and the shield which is equal to the voltage necessary to fire the spark plug, and $\epsilon$ is the specific inductive capacitance of the dielectric.

The potential difference between the inner and outer cylinders may be obtained by integrating between the inner and outer radii, i. e.

$$\int_0^E dV = E = \frac{-2\psi}{\epsilon} \int_{r_{n+1}}^{r_1} \frac{dx}{x} = \frac{2\psi}{\epsilon} \log \frac{r_{n+1}}{r_1} \quad (2)$$

and, since $\psi = CE$ $$C = \frac{\epsilon}{2 \log \frac{r_{n+1}}{r_1}} \text{ centimeters per cm. of length} \quad (3)$$

Applying the conversion factor for transforming capacitance in centimeters into capacitance in farads, this gives $$C = \frac{10^9}{v^2} \cdot \frac{\epsilon}{2 \log \frac{r_{n+1}}{r_1}} = \frac{(5.55 \times 10^{-13})\epsilon}{\log \frac{r_{n+1}}{r_1}} \begin{cases} \text{farads per} \\ \text{cm. of length} \end{cases} \quad (4)$$

Substituting Equation (3) in Equation (1), an equation for the electric gradient expressed in volts per unit of length is obtained, i. e.

$$\frac{dV}{dx} = gx = \frac{-E}{x \log \frac{r_{n+1}}{r_1}} \text{ volts per centimeter}$$

The sign is negative because the inner cylinder is at a higher potential than the outer cylinder. In this case, it is the absolute value of the gradient which is of importance and the equation may therefore be written $$gx = \frac{E}{x \log \frac{r_{n+1}}{r_1}} \quad (5)$$

The maximum electric gradient occurs where $x = r_1$ which is the minimum value of $x$, or $$g \max = \frac{E}{r_1 \log \frac{r_{n+1}}{r_1}} \quad (6)$$

In case a number of dielectrics are used, as in an ignition cable, the capacitance and gradient may be determined by assuming each dielectric to represent a condenser and these condensers to be connected in series. The lines of force or flux are radial and are therefore normal to each boundary surface. The flux density at any distance $x$ from the axis is $$\frac{\psi}{A} = \frac{\psi}{2\pi x}$$

where A is the area per unit length.

The elastance of a number of condensers in series may be written $$\frac{1}{C} = \frac{1}{C_1} + \frac{1}{C_2} + \frac{1}{C_3} + \ldots \text{ etc.}$$

For concentric cylinders, the capacitance per unit length may be written $$C_1 = \frac{\epsilon_1}{2 \log \frac{r_2}{r_1}}, C_2 = \frac{\epsilon_2}{2 \log \frac{r_3}{r_2}}, C_n = \frac{\epsilon_n}{2 \log \frac{r_{n+1}}{r_n}}$$

in which $C_1$ is the capacitance of a cylindrical tube having radii $r_1$ and $r_2$ and specific inductive capacitance $\epsilon_1$; $C_2$ is the capacitance of a cylindrical tube having radii $r_2$ and $r_3$ and specific inductive capacitance $\epsilon_2$; and $C_n$ is the capacitance of a cylindrical tube having radii $r_n$ and $r_{n+1}$ and specific inductive capacitance $\epsilon_n$.

Hence, the total elastance of a series of concentric cylinders may be expressed as $$\frac{1}{C} = 2 \left\{ \frac{\log \frac{r_2}{r_1}}{\epsilon_1} + \cdots + \frac{\log \frac{r_{x+1}}{r_x}}{\epsilon_x} + \cdots + \frac{\log \frac{r_{n+1}}{r_n}}{\epsilon_n} \right\}$$

and $$C = \frac{1}{2 \left\{ \frac{\log \frac{r_2}{r_1}}{\epsilon_1} + \cdots + \frac{\log \frac{r_{x+1}}{r_x}}{\epsilon_x} + \cdots + \frac{\log \frac{r_{n+1}}{r_n}}{\epsilon_n} \right\}} \begin{cases} \text{centimeters} \\ \text{per cm.} \\ \text{of length} \end{cases} \quad (7)$$

or $$C = \frac{5.55 \times 10^{-13}}{\left\{ \frac{\log \frac{r_2}{r_1}}{\epsilon_1} + \cdots + \frac{\log \frac{r_{x+1}}{r_x}}{\epsilon_x} + \cdots + \frac{\log \frac{r_{n+1}}{r_n}}{\epsilon_n} \right\}} \begin{cases} \text{farads} \\ \text{per cm.} \\ \text{of length} \end{cases} \quad (8)$$

If the inner cylinder is given a charge $\psi$ per unit length, the electric intensity at a distance $x$ from the axis is $$\frac{dV}{dx} = \frac{-2\psi}{\epsilon_x} = \frac{-2CE}{\epsilon_x}$$

and substituting in this equation the value of C obtained from equation (7), we obtain $$gx = \frac{-E}{\epsilon_x \cdot X \left\{ \frac{\log \frac{r_2}{r_1}}{\epsilon_1} + \cdots + \frac{\log \frac{r_{x+1}}{r_x}}{\epsilon_x} + \cdots + \frac{\log \frac{r_{n+1}}{r_n}}{\epsilon_n} \right\}} \quad (9)$$

From the above it will be seen that mathematical expressions have been developed for the capacitance and gradient of an ignition cable having any desired number of dielectrics. These equations or expressions may now be graphically recorded, and in Fig. 2 of the drawing there is illustrated such a graphical representation of the equations.

The curves of Fig. 2 are drawn for the simple case of a homogeneous dielectric as illustrated by Equations (3) and (6). This simplification in no way impairs the usefulness of the curves because the conclusions to be drawn could also be derived from graphs of the more general Equations (7) and (9). Furthermore, the simple Equations (3) and (6) very closely approximate the actual conditions because in general practice the insulation of an ignition cable is largely made up of a single dielectric, namely a rubber compound.

The curve A, illustrated in Fig. 2 is the graphical representation of Equation (3) in which $\epsilon$ was assumed to be 3.5, which is the average value of $\epsilon$ obtained from a number of samples of ignition cable. One abscissa scale of this graph represents the ratio $$\frac{r_1}{r_2}$$

that is, the ratio of the radius of the conductor to the radius of the cable. A second abscissa scale is shown, giving the conductor radius in centimeters when the cable radius is fixed at 0.38 cm. or an outside diameter of approximately three-fourths of a centimeter. The ordinates represent the capacitance per meter of the cable expressed in micro-microfarads. It is apparent from this curve that the capacitance increases from zero for zero radius of the conductor to infinity for a conductor radius equal to the outside radius of the cable. Practically, neither of these extremes is attainable.

The curve B, illustrated in Fig. 2, is the graphical representation of Equation (6). I have used a value for E of 15,000 volts and for $r_2$ of 0.38 cm. The value for E is the average maximum voltage I have found necessary to fire the spark plugs usually employed in aircraft engines and the value for $r_2$ is the average outside radius of the ignition cable used with such spark plugs. The abscissæ for curve B represent either the ratio $$\frac{r_1}{r_2}$$

or $r_1$ in centimeters, and the ordinates represent the gradient at the surface of the conductor expressed in kilovolts per centimeter. It is apparent from this curve that the gradient at the surface of the conductor drops from infinity for a zero radius conductor to a minimum value of approximately 107 kv. per cm. for $$\frac{r_1}{r_2} = \frac{1}{2.718}$$

to infinity again for $$\frac{r_1}{r_2}$$

equal to unity. If a cable were designed only for minimum gradient in the dielectric the ratio of the radius of the conductor to the radius of the cable would be chosen for the minimum point of the curve B. If the insulation adjacent the conductor will safely stand gradients in excess of this minimum value a decrease in capacitance may be obtained by decreasing the ratio $$\frac{r_1}{r_2}.$$

It is desired to obtain the maximum possible decrease in capacitance without subjecting the insulation to excessive electrical strains.

Another important factor to be considered in building an ignition cable is the gradient at the surface of the cable. This gradient may be effective in the formation of corona in the air at the surface of the cable, and the corona formation may have destructive effect on the rubber of the cable. The relationship between the gradient in the air space at the surface of the cable and the properties of the cable may be determined from a special form of Equation (9). This form is $$gr_2 = \frac{E}{e_2 r_2 \left[ \frac{\log \frac{r_2}{r_1}}{e_1} + \frac{\log \frac{r_3}{r_2}}{e_2} \right]} \quad (10)$$

in which $r_1$ is the radius of the conductor of the cable, $r_2$ the outside radius of the insulation, and $r_3$ the inside radius of the conducting shield.

The specific inductive capacitance of the cable is represented by $e_1$ and of the air, $e_2$. This latter quantity may be considered as unity. Generally $r_3$ and $r_2$ are so nearly equal that their ratio may be considered as unity so that the expression for the gradient at the surface of the cable becomes $$gr_2 = \frac{e_1 E}{r_2 \log \frac{r_2}{r_1}} \quad (11)$$

The curve C of Fig. 2 is the graph of this equation using values of E, $e_1$ and $r_2$ of 15,000 volts, 3.5 and 0.38 centimeters, respectively. The abscissæ and ordinates are the same as for curve B except that the ordinate scale is of different magnitude. It will be observed that the form of this curve is similar to the form of the capacitance curve A.

In most high voltage cable design, the choice of the diameter of the conductor is of first importance. This value is chosen with regard to the permissable resistance of the cable per unit length. I have found that the resistance of the conductor in an ignition cable is not an important factor, as regards its effectiveness in transferring energy from a spark coil or magneto to a spark plug, consequently no restrictions in design need be imposed by resistance considerations of the conductor.

In distinction to previous theories, I have found that from the standpoint of reduced radio interference and efficient spark plug operation, a high resistance of the connection between the spark plug and the source of energy is desirable. This point of view is opposite to that of present practice in ignition cable design. The upper limit to the resistance occurs when the time constant of the circuit becomes appreciable or when the energy lost in the conductor becomes an appreciable part of the total energy transferred. Using present known alloys or metals this upper resistance limit would not be reached unless the conductor diameter were reduced to a point far beyond the limit permitted by safe electrical gradient and mechanical strength. This means that in the development of an ignition cable of minimum capacitance according to the present invention no limitations as to conductor size or material will be imposed by resistance requirements.

I have therefore found that the ignition cable of minimum capacitance is the cable with the conductor of smallest diameter consistent with safe gradient in the dielectric and sufficient mechanical strength. I have found from Equation (6) that the optimum ratio of the radius of the conductor to the radius of the cable is given by the following equation, $$R^R = e^{\frac{-E}{r_2 G}} \quad (12)$$

Where $$R = \frac{r_1}{r_2}$$

E is the magnitude of the highest voltage necessary to fire the spark plug, G is the magnitude of the maximum gradient the dielectric of the cable can stand without breakdown and $r_2$ is the outside radius of the cable. Practically, the value of R may be determined from curve B of Fig. 2. The value of R will be the abscissa of the point on the curve whose ordinate is equal to G. I have found that if rubber is used as the dielectric, having a value for G of about 240 kv. per cm. the values for R and $r_1$ are approximately 0.06 and 0.023 cm. respectively or a conductor diameter of approximately one-half millimeter. I have found that a large number of the rubber insulating compounds of ignition cables now in use withstand gradients of this magnitude. I have also found that if a conductor of this size be made of steel, stainless steel, phosphor bronze or other material of high tensile strength, its mechanical properties are satisfactory. The use of conductors formed of these high tensile strength materials is additionally advantageous in that these materials provide high resistance in the secondary leads of an ignition system in which the cable may be used, which I have found to improve the operation of the ignition system. The higher resistance of the ignition cable reduces radio interference because of increased damping in the interfering waves and reduces the intensity of the current in the spark causing less wear on the spark plug electrodes.

The previous equations and curves refer to a cable with a solid or unstranded conductor. In the practical application of the art stranded conductors are generally used in the construction of ignition cables. This departure will not materially affect the capacitance consideration but it will modify the gradient at the surface of the conductor. From a practical standpoint only the change in the gradient at the surface of the conductor need be considered when the change is made from a solid to a stranded conductor. This correction to the gradient equation may be adequately made by the use of a constant $K_n$ which represents the per cent increase in the gradient in the dielectric at the surface of the conductor when a change is made from a solid conductor to a stranded conductor of $n$ strands and having the same total cross sectional area as the solid conductor. The value of $K_n$ may be considered as a constant as regards both the range of ratio of conductor radius to cable radius and the number of strands in a stranded cable which are of importance in ignition cable design. The equation which defines the desired ratio of conductor radius to cable radius may then be written $$R^R = e^{\frac{-E(1+K_n)}{r_n G}} \quad (13)$$

Values for $K_n$ may be obtained from standard treatises on dielectric theory (see for example "Theory of Dielectrics" by Schwaeger and Samson, page 275). $K_n$ is approximately the same for both 7 strand and 19 strand conductors and is about 30%. The optimum value of R may then be found by dividing G by $(1+K_n)$ and determining the abscissa for the point on curve B of Fig. 2 whose ordinate is $G/(1+K_n)$. The value of R will be the abscissa then selected. If a value for G of 240 kilovolts per cm. is used, the value of $G/(1+K_n)$ is about 180 kilovolts per cm. and the abscissa corresponding to this ordinate is 0.086 such abscissa being chosen from a point on the curve to the left of the minimum thereof. This corresponds to a radius for the conductor of 0.032 cm. or a diameter of approximately three-fifths millimeter.

A further advantage arising from this use of the smaller conductor, as defined by the present invention, is that the gradient at the outside surface of the cable will be less, since as shown in curve C of Fig. 2, this gradient decreases as the diameter of the conductor decreases. Therefore the possibility of a detrimental effect on the rubber dielectric from corona is reduced because of the use of this conductor.

The definition of the optimum value for the ratio of the radius of the conductor to the radius of the cable will be modified further by the presence in the cable of other dielectrics such as braid and lacquer as shown in Fig. 1. The general equation for the magnitude of the gradient at the surface of the conductor in the general case of a cable having a number of dielectrics may be obtained from Equation (9) and is $$g_{r_1} = \frac{E(1+K_n)}{\epsilon_1 R r_{n+1} \left\{ \frac{\log \frac{r_2}{R r_{n+1}}}{\epsilon_1} + \frac{\log \frac{r_3}{r_2}}{\epsilon_2} + - - + \frac{\log \frac{r_{n+1}}{r_n}}{\epsilon_n} \right\}} \quad (14)$$

where R is equal to $$\frac{r_1}{r_{n+1}}$$

i. e., the ratio of the conductor radius to the outside radius of the cable.

The value of optimum radius in the general case will then be $$(RM)^R = e^{\frac{-E(1+K_n)}{r_{n+1} G}} \quad (15)$$

Where M is a constant defined as follows:

$$M = \frac{r_{n+1}}{r_2} \times \left(\frac{r_2}{r_3}\right)^{\frac{\epsilon_1}{\epsilon_2}} \times \left(\frac{r_3}{r_4}\right)^{\frac{\epsilon_1}{\epsilon_3}} \times - - \times \left(\frac{r_n}{r_{n+1}}\right)^{\frac{\epsilon_1}{\epsilon_n}} \quad (16)$$

It will be apparent to those skilled in the art that I have provided by the present invention an ignition cable of radically new design and possessing characteristics offering considerable advantages over ignition cables constructed according to known designs.

It is to be expressly understood that the present invention is not limited to any specific form or dimension disclosed herein, or otherwise than by the appended claims.

The invention described herein may be manufactured and used by or for the Government of the United States of America for governmental purposes, without the payment of any royalty thereon.

What is claimed is:

1. A high tension ignition cable for use with the ignition systems of internal combustion engines, said cable comprising a conductor made from stainless steel, and insulating means surrounding said conductor.

2. A high tension ignition cable for use with the ignition systems of internal combustion engines, said cable comprising a stranded conductor made from stainless steel and having a diameter of approximately three-fifths millimeter, and insulating means surrounding said conductor.

3. A high tension ignition cable for use with the ignition systems of internal combustion engines, said cable comprising a conductor made from phosphor bronze, and insulating means surrounding said conductor.

4. A high tension ignition cable for use with the ignition systems of internal combustion engines, said cable comprising a conductor made from steel, and insulating means surrounding said conductor.

5. An ignition system for internal combustion engines comprising a source of electric energy, a spark plug, a cable connecting said source and said spark plug, said cable comprising a conductor and insulating means surrounding said conductor, the ratio of the diameter of said cable to the diameter of said conductor being so chosen with respect to the voltage necessary to fire said spark plug that this ratio has, for any fixed value of the diameter of said cable, a value which is in the range of the largest possible value consistent with safe electrical gradient in the insulation adjacent said conductor and also consistent with sufficient mechanical strength of the conductors.

6. An ignition system for internal combustion engines comprising a source of electric energy, a spark plug, and a cable connecting said source to said spark plug, said cable comprising a conductor, and insulating means surrounding said conductor the diameter of said conductor being related to the outside diameter of said cable and the voltage necessary to fire said spark plug in such a ratio that for any chosen outside diameter of the cable the capacitance of the cable has a value which is in the range of the smallest value consistent with safe electrical gradient in the insulator adjacent to the conductor, and also consistent with sufficient mechanical strength of the conductor.

7. An ignition system for internal combustion engines comprising a source of electric energy, a spark plug, and a cable connecting said source and said spark plug, said cable comprising a conductor and insulating means surrounding said conductor, the radius of said conductor being chosen with respect to a selected set of dimensions and electrical properties of said insulating means and the voltage necessary to fire said spark plug according to the equation $$(RM)^R = e^{\frac{-E(1+K_n)}{r_{n+1}G}}$$

and being so chosen in accordance with said equation as to provide a cable the capacitance of which is in the range of the minimum value of capacitance which is consistent with safe electrical gradient in the insulation adjacent to the conductor and is also consistent with sufficient mechanical strength of the conductor, and in which equation R is the ratio of the radius of the conductor to a selected radius of the cable, E is the maximum voltage necessary to fire the spark plug, G is the maximum electrical gradient which the insulator adjacent to the conductor can safely stand without breakdown, $K_n$ is a factor equal to zero for a solid conductor and equal to 0.30 for a seven or nineteen strand conductor and representing the increase in gradient at the surface of a stranded conductor over the gradient at the surface of a solid conductor, $r_{n+1}$ is the outside radius of the cable having $n$ layers of insulating and shielding material, and M is a constant determined by the dimensions and electrical properties of the insulators surrounding the conductor and defined by the equation $$M = \frac{r_{n+1}}{r_1} \times \left(\frac{r_2}{r_3}\right)^{\frac{e_1}{e_2}} \times \left(\frac{r_3}{r_4}\right)^{\frac{e_1}{e_3}} \times \cdots \times \left(\frac{r_n}{r_{n+1}}\right)^{\frac{e_1}{e_n}}$$

in which equation $r_2$ to $r_{n+1}$ are the radii of $n$ successive layers of insulating and shielding material surrounding said conductor and in which $e_1$ to $e_n$ are the values of the specific inductive capacitance of said layers of insulating and shielding materials.

8. An ignition system for internal combustion engines comprising a source of electric energy, a spark plug, and a cable connecting said source and said spark plug, said cable comprising a conductor and insulating means surrounding said conductor, the dimensions of said conductor being chosen with respect to the dimensions and electrical properties of said insulating means and the voltage necessary to fire said spark plug in such a ratio that if a curve is drawn to show the variation of electrical gradient in the insulator adjacent said conductor with the radius of said conductor, all of the other constants of said cable being fixed, the ordinates of said curve representing the electrical gradient in the insulator at the surface of the conductor, and the abscissae representing conductor radii, the radius of said conductor will be the abscissa of a point on said curve the ordinate of which is in the range of the maximum gradient said insulator adjacent to said conductor can safely stand without breakdown.

9. An ignition system for internal combustion engines, comprising a source of electric energy, a spark plug, and a cable connecting said source and said spark plug, said cable comprising a conductor and insulating means surrounding said conductor, the radius of said conductor being so related to any chosen set of dimensions and electrical properties of said insulating means and to the voltage necessary to fire said spark plug that if the equation $$(gr_1) = \frac{E(1+K_n)}{r_1 \log \frac{r_{n+1}}{r_1 M}}$$

be plotted on a graph whose ordinates represent the electrical gradient in the insulating means at the surface of the conductor, and whose abscissae represent conductor radii, the radius of said conductor will be the abscissa of a point on the curve whose ordinate is in the range of the maximum gradient said insulator adjacent to said conductor can safely stand without breakdown, and in which equation $(gr_1)$ is the gradient in the insulating means at the surface of the conductor, E is the voltage necessary to fire the spark plug, $r_1$ is the radius of the conductor, $r_{n+1}$ is the outside radius of the insulating means adjacent to the conductor, $n$ is the number of layers of insulating or shielding material surrounding the conductor, $K_n$ is a factor equal to zero for a solid conductor and equal to 0.30 for a seven or nineteen strand conductor and representing the increase in gradient at the surface of a stranded conductor over the gradient at the surface of a solid conductor, and M is a constant determined by the dimensions and electrical properties of the insulating and shielding materials surrounding the conductor and defined by the equation $$M = \frac{r_{n+1}}{r_1} \times \left(\frac{r_2}{r_3}\right)^{\frac{e_1}{e_2}} \times \left(\frac{r_3}{r_4}\right)^{\frac{e_1}{e_3}} \times \cdots \times \left(\frac{r_n}{r_{n+1}}\right)^{\frac{e_1}{e_n}}$$

in which $r_2$ to $r_{n+1}$ are the radii of $n$ successive layers of insulating and shielding material surrounding said conductor and $e_1$ to $e_n$ are the values of the specific inductive capacitance of said layers of insulating and shielding material.

10. An ignition cable for connecting the source of electric energy and the spark plug of the ignition system of an internal combustion engine, said cable comprising a conductor and insulating means surrounding said conductor, said conductor being formed of a material having an appreciably greater tensile strength and an appreciably higher specific resistance than copper.

11. A high tension ignition cable for use with the ignition system of an internal combustion engine, said cable comprising a solid conductor made from stainless steel and having a diameter of approximately one-half millimeter, and insulating means surrounding said conductor.

12. A high tension ignition cable for use with the ignition system of an internal combustion engine, said cable comprising a conductor having a diameter of approximately one-half millimeter, and insulating means consisting mainly of a rubber compound and having an outside diameter of approximately three-fourths of a centimeter.

13. A high tension ignition cable for use with the ignition system of an internal combustion engine, said cable comprising a stranded conductor having a diameter of approximately three-fifths millimeter, and insulating means surrounding said conductor and consisting mainly of a rubber compound and having an outside diameter of approximately three-fourths of a centimeter.

14. A high tension ignition cable for use with the ignition system of an internal combustion engine, said cable comprising a stranded conductor formed from a material having an appreciably greater tensile strength and an appreciably higher specific resistance than copper and having a diameter of approximately three-fifths millimeter, and insulating means surrounding said conductor and consisting mainly of a rubber compound and having an outside diameter of approximately three-fourths of a centimeter.

15. A high tension ignition cable for use with the ignition system of an internal combustion engine, said cable comprising a stranded conductor formed of stainless steel and having a diameter of approximately three-fifths millimeter, and insulating means surrounding said conductor and consisting mainly of a rubber compound and having an outside diameter of approximately three-fourths of a centimeter.

16. A high tension ignition cable for use with the ignition system of an internal combustion engine, said cable comprising a solid conductor made from a material having an appreciably greater tensile strength and an appreciably higher specific resistance than copper, and having a diameter of approximately one-half millimeter, and insulating means surrounding said conductor.

MELVILLE F. PETERS.